US006954340B2

(12) United States Patent
Shukh et al.

(10) Patent No.: US 6,954,340 B2
(45) Date of Patent: Oct. 11, 2005

(54) PERPENDICULAR MAGNETIC RECORDING HEAD WITH NONMAGNETIC WRITE GAP GREATER THAN TWICE SIDE SHIELD GAP DISTANCE

(75) Inventors: Alexander M. Shukh, Savage, MN (US); Ned Tabat, Chanhassen, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 44 days.

(21) Appl. No.: 10/113,988

(22) Filed: Apr. 1, 2002

(65) Prior Publication Data

US 2002/0176214 A1 Nov. 28, 2002

Related U.S. Application Data

(60) Provisional application No. 60/293,278, filed on May 23, 2001.

(51) Int. Cl.[7] .............................. G11B 5/39; G11B 5/23; G11B 5/31
(52) U.S. Cl. ...................... 360/317; 360/119; 360/126
(58) Field of Search .................................. 360/317, 125, 360/126, 122, 119

(56) References Cited

U.S. PATENT DOCUMENTS

| | | | | |
|---|---|---|---|---|
| 4,656,546 A | | 4/1987 | Mallory | 360/110 |
| 4,935,832 A | * | 6/1990 | Das et al. | 360/319 |
| 5,181,151 A | | 1/1993 | Yamashita et al. | 360/126 |
| 6,504,675 B1 | | 1/2003 | Murdock et al. | 360/125 |
| 6,631,054 B2 | * | 10/2003 | Miyazaki et al. | 360/317 |
| 6,707,642 B1 | * | 3/2004 | Batra | 360/119 |

* cited by examiner

*Primary Examiner*—Craig A. Renner
(74) *Attorney, Agent, or Firm*—Brendan J. Hanley

(57) ABSTRACT

A magnetic head for perpendicular recording on double layer media with suppressed side writing and controlled write width is disclosed. The present invention reduces the problem of side writing and controls the write width of the writing element by providing a writing element with a trailing edge sized dimensionally larger than the leading edge, side shields, and specifically spaced writing gaps placed at various distances between the write element and the side shields, return poles, and the main pole.

29 Claims, 15 Drawing Sheets

PERPENDICULAR MAGNETIC RECORDING HEAD WITH NONMAGNETIC WRITE GAP GREATER THAN TWICE SIDE SHIELD GAP DISTANCE

CROSS REFERENCE TO RELATED APPLICATIONS

This application claims the benefit of U.S. Provisional Application No. 60/293,278, filed May 23, 2001.

FIELD OF THE INVENTION

The present invention generally relates to magnetic read and write heads for high areal density recording on double layer perpendicular media, and in particular the present invention relates to the writing portion of such head wherein such head has control over the width of the recorded track and skew effect.

BACKGROUND OF THE INVENTION

As the density of data tracks on magnetic discs continues to increase, increased efficiency of the magnetic read/write head is required. Perpendicular recording, as opposed to the more conventional longitudinal recording, is a form of magnetic recording in which magnetic moments representing bits of data are orientated perpendicularly to the surface of the recording layer of the recording medium. Perpendicular recording may offer advantages over longitudinal recording, such as the ability to achieve higher linear densities, which may be important to extend disc drive technology beyond current data density limitations.

To further increase linear density, double layer media may be used in conjunction with perpendicular magnetic heads. Typically the double layer perpendicular media may consist of a high coercivity thin storage layer with perpendicular to-plane anisotropy and a soft magnetic underlayer (keeper) with in-plane anisotropy and relatively high permeability.

U.S. Pat. No. 5,181,151 ('151), issued to Masami Yamashita et al, describes a perpendicular recording head having a main pole and a return pole. The space between the main pole and return pole is the write gap. Magnetization transitions on the double layer perpendicular media are recorded by the trailing top edge of the main pole. The recorded transitions reproduce the shape of the main pole projected on the media. The write head of the '151 patent can not control the width of the recorded tracks and hence cannot be used effectively for high track density recording. Further, distribution of the write field across the track width formed by the head as described by Yamashita et al, has a "bell" like shape. The width of the recorded track is defined by the main pole width, write current, media coercivity and space between the head and the soft magnetic underlayer of the media. Due to the shallow field decay profile in cross-track direction, the recorded tracks of the device described in the '151 patent are relatively wide and there is a probability of adjacent track erasure. Thus, there is a need for a magnetic head having controllable width of recorded track and suppressed skew effect.

A recording head with controllable track width is described in U.S. Pat. No. 4,656,546. The magnetic head in patent '546 includes a main pole, a return pole, a write gap G between the main pole and return pole, and side shields on either side of the main pole that create side gaps $G_s$. Transitions are recorded at the trailing edge of the main pole that is adjacent to the write gap. The length of the write and side gaps are scaled by the distance D, which is the distance between the head air bearing surface (ABS) and the soft magnetic underlayer of the double layer media. As described in the '546 patent, the distance of write gap G is in the range from D/2 to 2D and the distance of side gaps $G_s$ can be larger than the distance G. The distances of write gap and side gaps that is described in the '546 patent substantially reduce efficiency of the writer and do not support high-track density recording on high coercivity media. The write field in the media of the device described in the '546 patent is believed to barely exceed 6000 Oe and the writer cannot support recording on media with coercivity above 3000 Oe. Hence the head can only be used to record on perpendicular media with a coercivity up to 3000 Oe and a saturation field up to 6000 Oe. That limits the application of '546 high areal density recording due to necessity of higher media coercivity exhibiting high thermal stability. Thus there is a need for a magnetic head that can record on perpendicular media with a saturation field larger than 6000 Oe. The present invention addresses these and other needs and provides advantages that will become apparent to those skilled in the art.

SUMMARY OF THE INVENTION

The present invention provides a magnetic read/write head design for high-track density recording on double layer perpendicular media with suppressed side writing. The magnetic read/write head of the present invention includes a main pole, a first return pole and magnetic side shields magnetically connected to the first return pole to suppress side writing. The main pole is separated from the first return pole by the write gap in down-track direction and from the magnetic side shield by narrow nonmagnetic gaps in the cross-track direction. To improve the writer efficiency and provide high write field gradient, the length of the write gap should be more than twice the distance between the ABS and the soft magnetic underlayer. Side writing at skew angles is suppressed by providing for the trailing edge of the main pole to be larger than the leading edge of the main pole at the ABS. A side connecting the leading and trailing edge should create an angle that is not less than the maximal skew angles in the drive.

In an alternative embodiment, the magnetic read/write head includes a main pole, a first return pole, a second return pole and magnetic side shields magnetically connected to the first and second return poles to suppress side writing. The main pole is separated from the first return pole by the leading write gap in up-track direction. The main pole is also separated from the second return pole by the trailing write gap in down-track direction and the side magnetic shield by narrow nonmagnetic side gaps in the cross-track direction. The leading gap is at least twice the distance of the trailing gap in order to improve writer efficiency and provide high gradient of the write field.

These and various other features as well as advantages which characterize the present invention should be apparent to those skilled in the art upon reading the following detailed description and review of the associated drawings.

DETAILED DESCRIPTION

Figure 1:
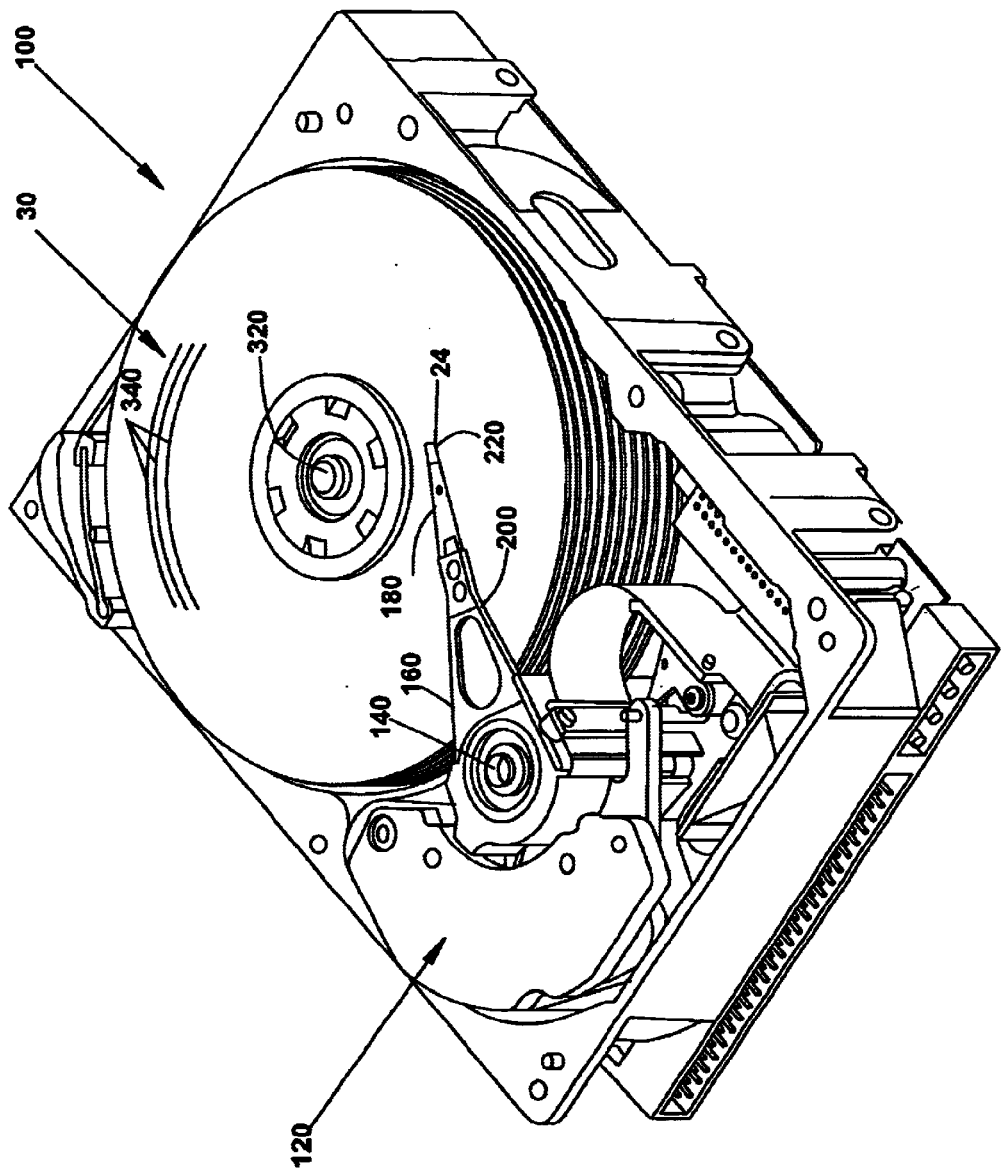
FIG. 1 is a perspective front elevational view of a dual stage disc drive actuation system according to the present invention.

FIG. 1 is a perspective view of a disc drive 100 including a dual-stage disc drive actuation system for positioning a head-carrying slider over a track 340 of disc 30. Disc drive 100 includes voice coil motor 120 arranged to rotate actuator arm 160 on a spindle around axis 140. Head suspension 180 is connected to actuator arm 160 at head mounting block 200. A microactuator is attached to head suspension 180 by flexure 220 and carries slider 24, which in turn carries a transducing head for reading and/or writing data on concentric tracks on disc 30. Disc 30 rotates around axis 320, so that windage is encountered by slider 24 to keep it aloft a small distance above the surface of disc 30.

Figure 2:
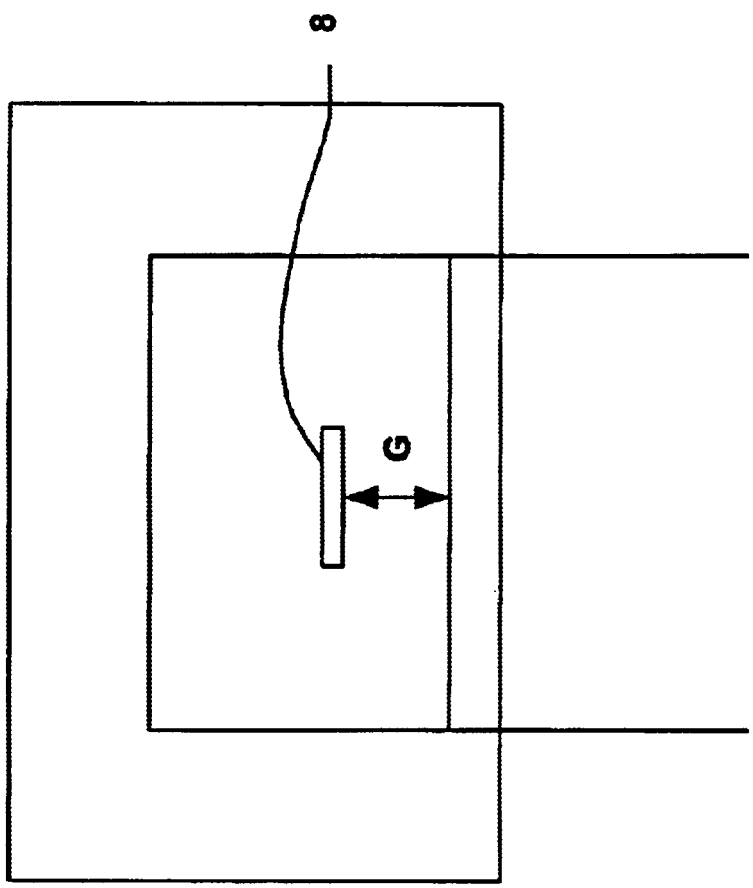
FIG. 2 is a front view taken from the ABS of a prior typical head for perpendicular recording on double layer media.
Figure 3:
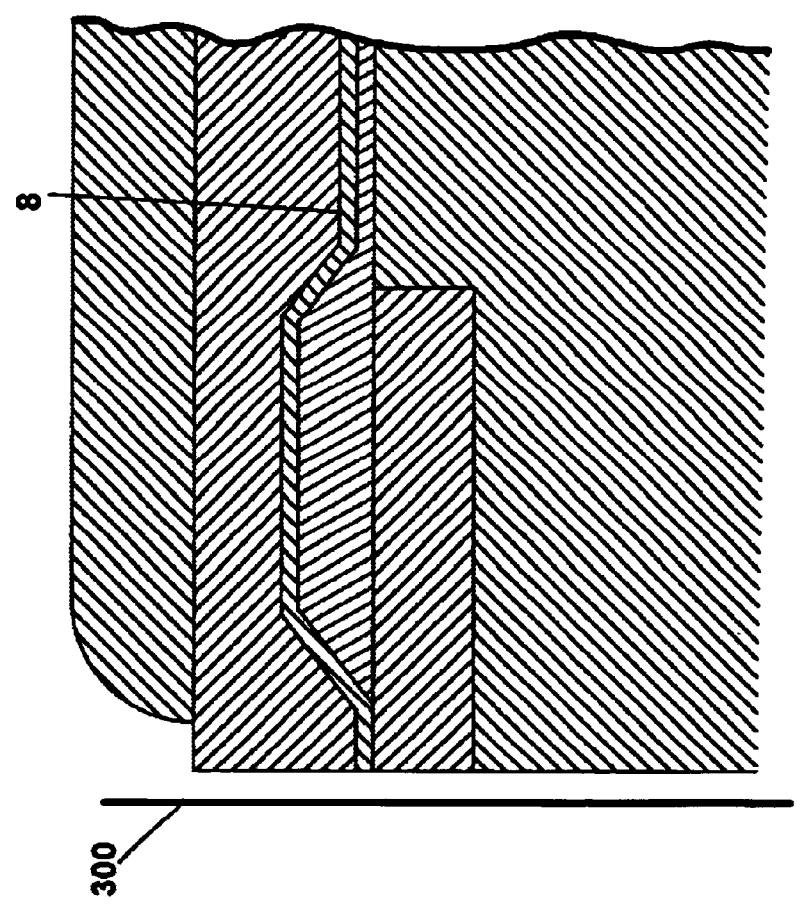
FIG. 3 is a side cross-sectional view of the head of the type shown in FIG. 2.

FIGS. 2 and 3 illustrate a conventional head for perpendicular recording that has been described in U.S. Pat. No. 5,181,151 ('151), issued to Masami Yamashita et al. Magnetization transitions on the double layer perpendicular media 300 are recorded by the trailing top edge of trailing main pole 8. The recorded transitions reproduce the shape of the main pole 8 projected on the media 300. The write head according to the '151 patent does not provide features to control the width of the recorded tracks and hence cannot be used for high track density recording. Distribution of the write field across the track width has a "bell" like shape. The width of the recorded track is defined by the main pole width, write current, media coercivity and head to the soft magnetic underlayer spacing. Due to the slow field decay profile in cross-track direction, the recorded tracks are relatively wide and there is a probability of adjacent track erasure at high track density recording.

Figure 4:
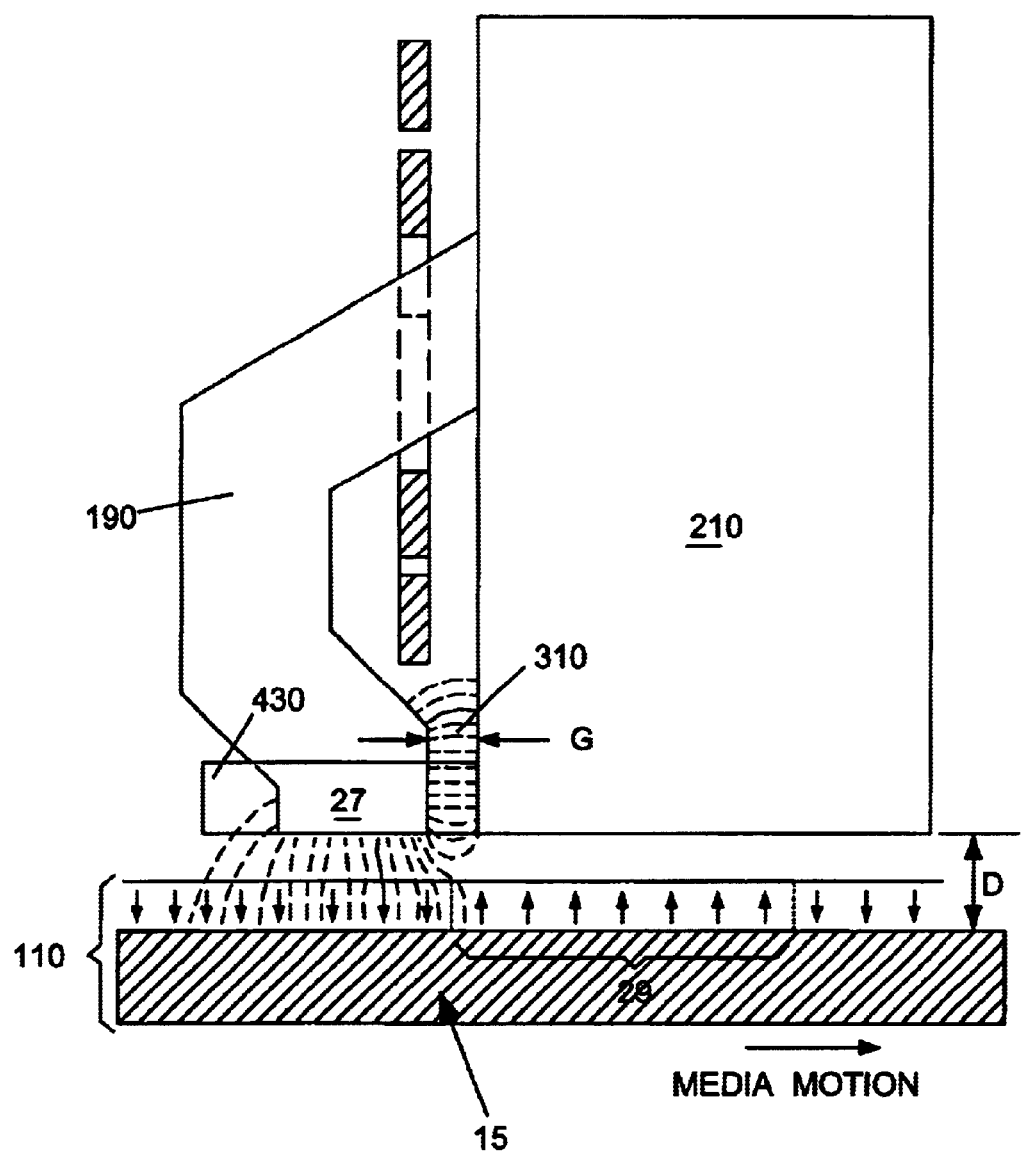
FIG. 4 is a side cross-sectional view of a prior typical head for perpendicular recording on double layer media.
Figure 5:
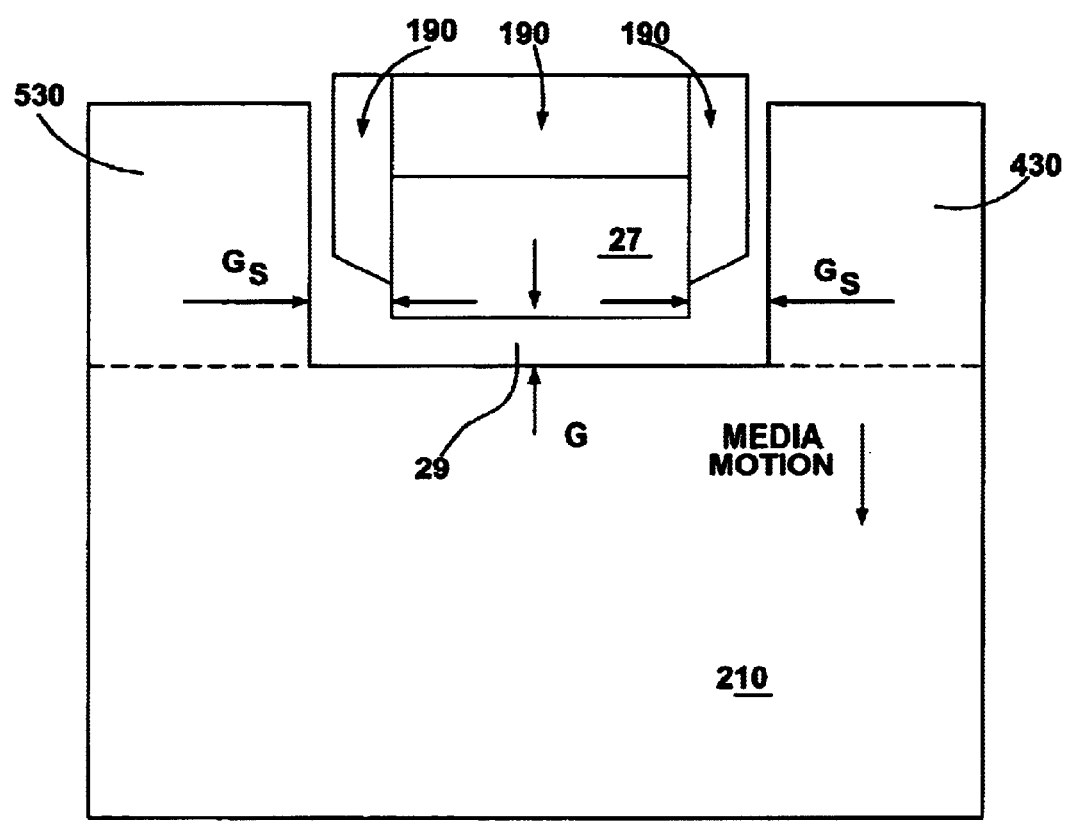
FIG. 5 is a front view taken from the ABS of head of the type shown in FIG. 4.

A recording head with controllable track width is described in U.S. Pat. No. 4,656,546 ('546) issued to Michael Mallory, is shown in FIGS. 4 and 5. Transistions are recorded at the trailing edge of the main pole 27 that is adjacent to the write gap 310. The main pole 27 is spaced from return pole 210 and side shields 430 and 530, by write gap 29 and side gaps 190, respectively. The length of the gaps 29 and 190 is scaled by the distance D between the head ABS and the soft magnetic underlayer 15 of the double layer media 110. As described in patent '546 in FIG. 4, the length G of the write gap 29 is in the range from D/2 to 2D and the length $G_s$ of the side gap 190 can be larger than write gap 29.

Figure 6:
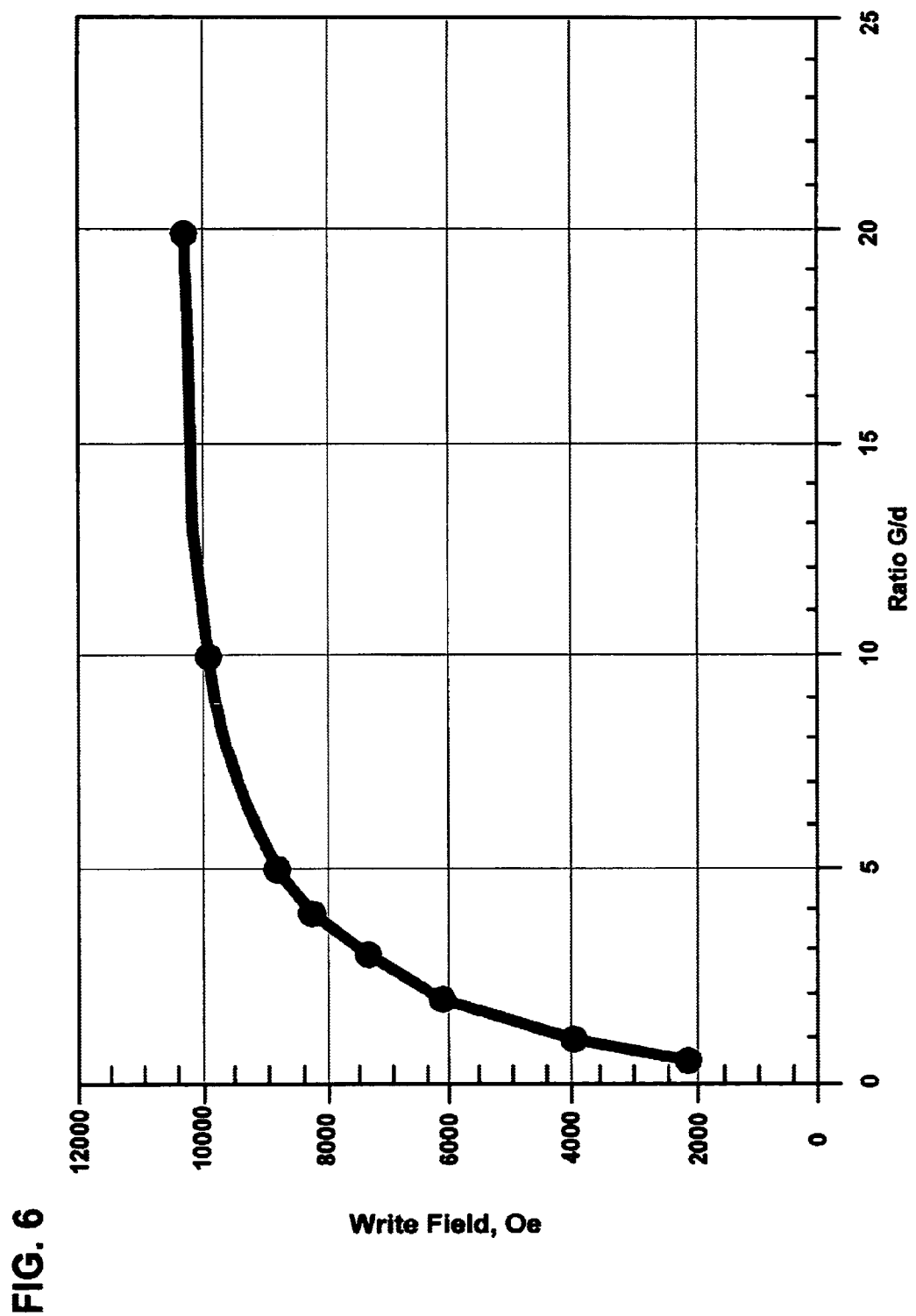
FIG. 6 is a graph illustrating that the write field strength in the middle of perpendicular media dependence upon a write gap length.

FIG. 6 shows the effect of the write gap length on the strength of the write field in the media in regard to the patent described in '546. The gap length G is normalized to the distance D between the main pole 27 and the soft magnetic underlayer 15. The side gap $G_s$ was assumed to be equal to the write gap. At the conditions claimed in the FIGS. 4 and 5, write field in the media barely exceeds 6000 Oe. Hence the head can be used to record on perpendicular media with coercivity up to 3000 Oe and a saturation field up to 6000 Oe. That limits the application of this inventions high areal density recording due to necessity of higher media coercivity exhibiting high thermal stability.

Figure 7:
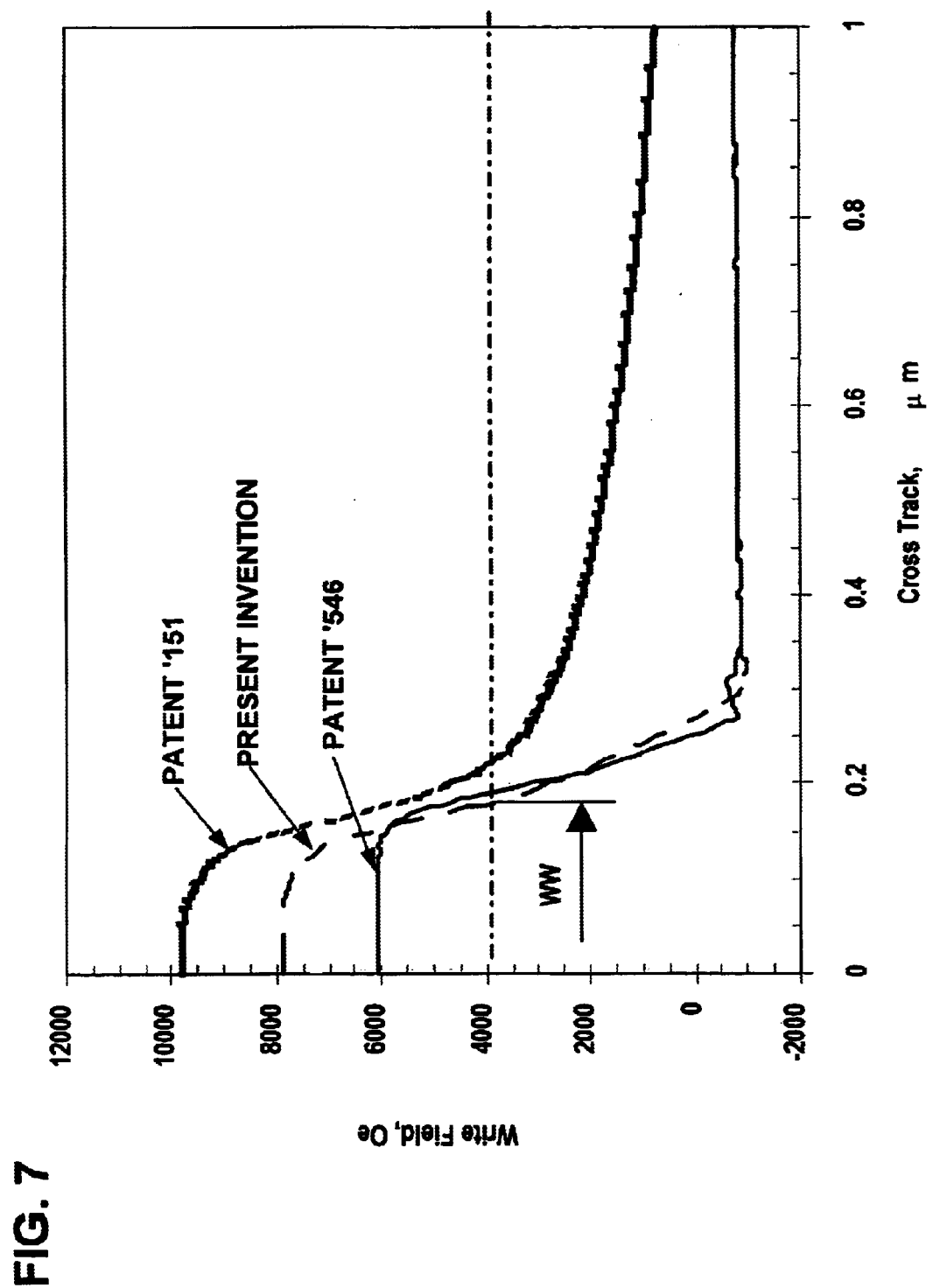
FIG. 7 is a graph showing a distribution of the write field in the middle of a perpendicular media in relation to the width of the cross-track.
Figure 8:
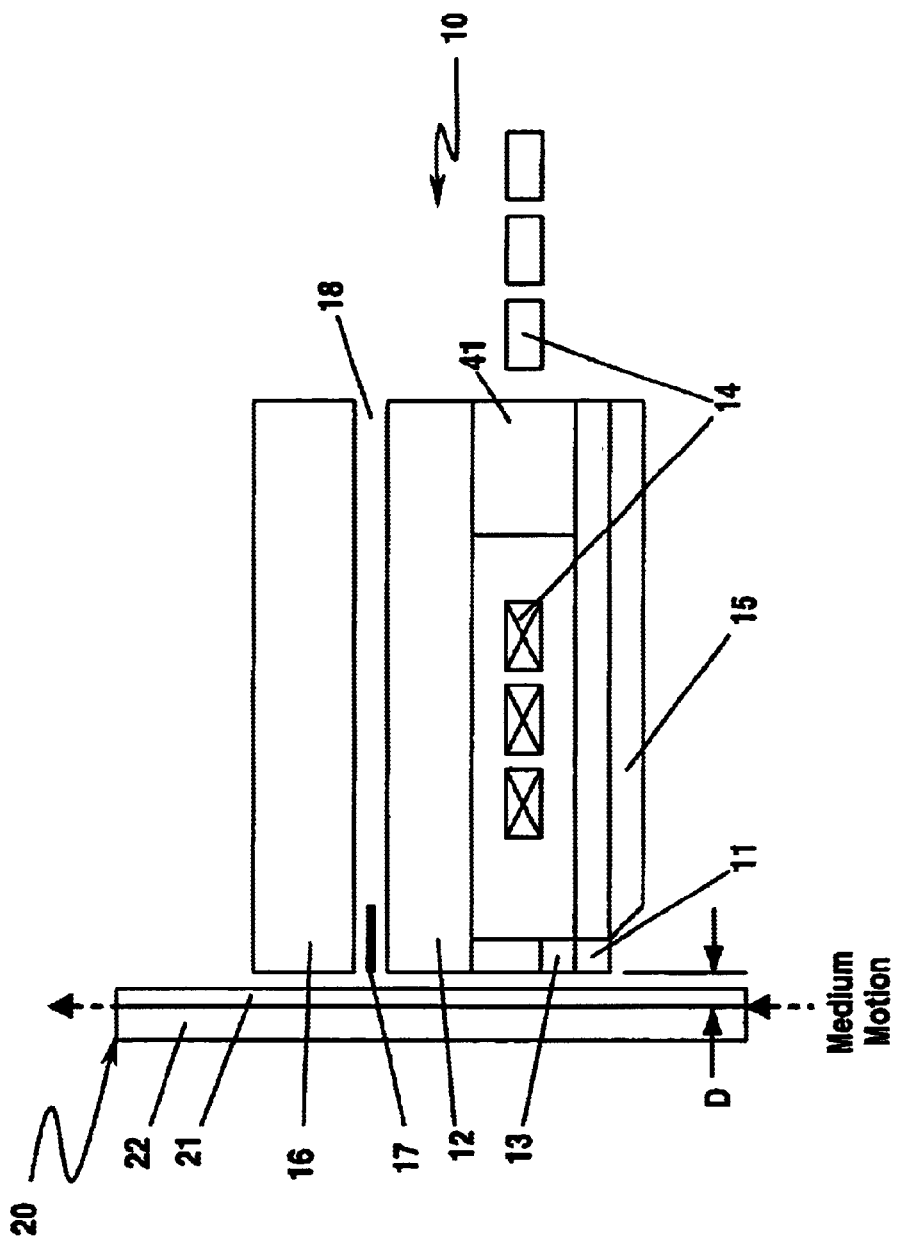
FIG. 8 is a side cross-sectional view of the magnetic transducer according to the present invention for perpendicular recording with controllable write field gradient, wherein the write element is upstream from the reader element.
Figure 9:
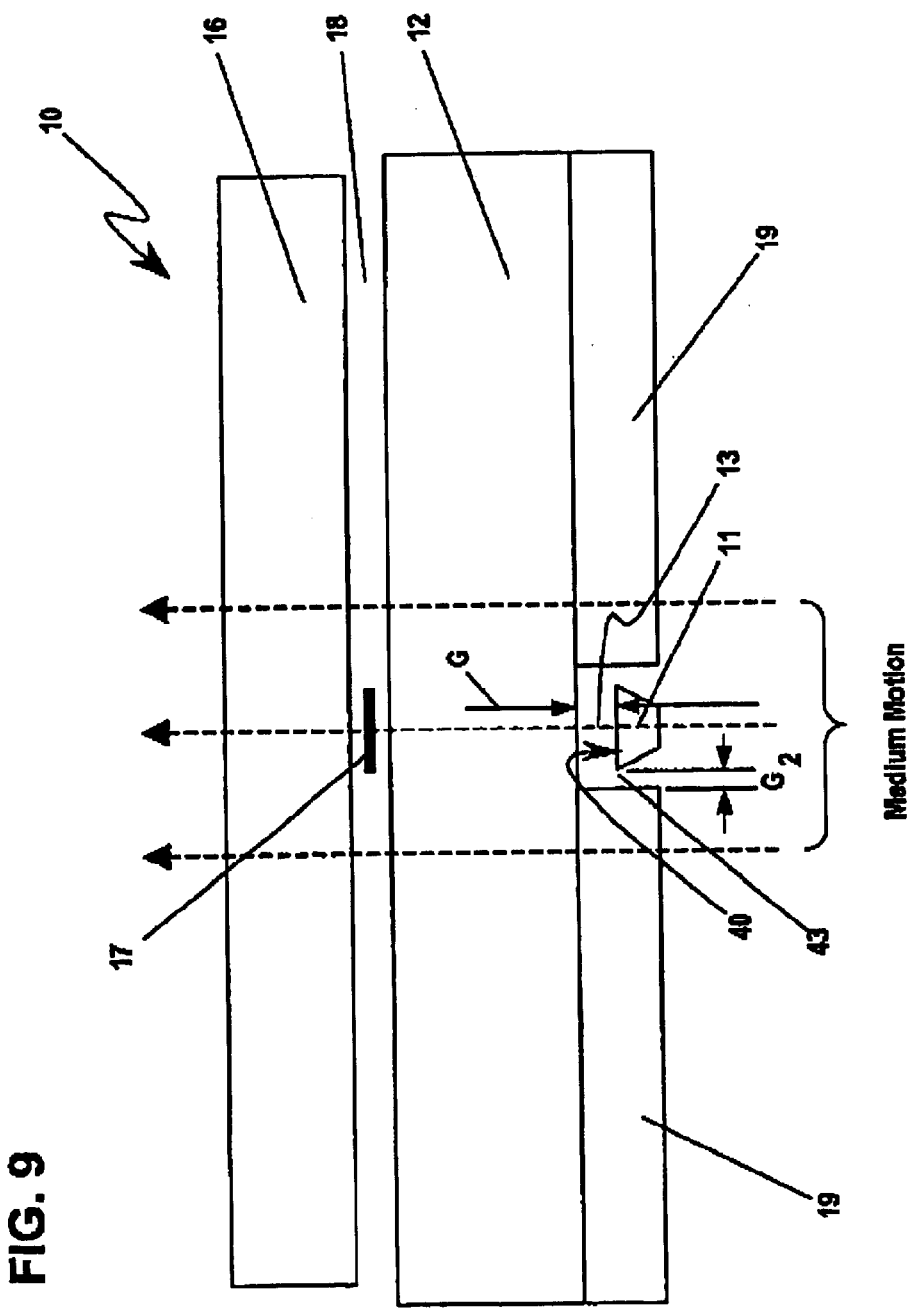
FIG. 9 is a front view taken from the ABS of the magnetic transducer of the type shown in FIG. 8.
Figure 10:
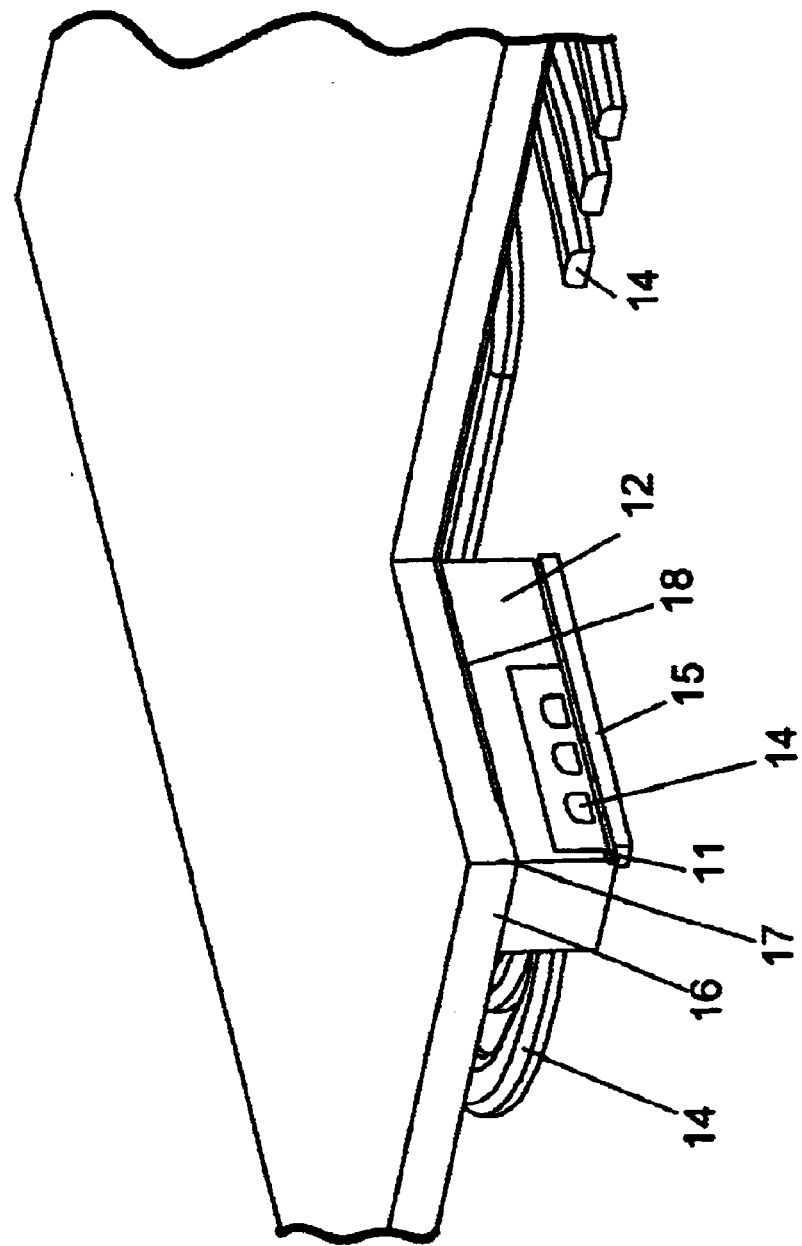
FIG. 10 is a partial sectional perspective view of the magnetic transducer of the type shown in FIG. 8.
Figure 11:
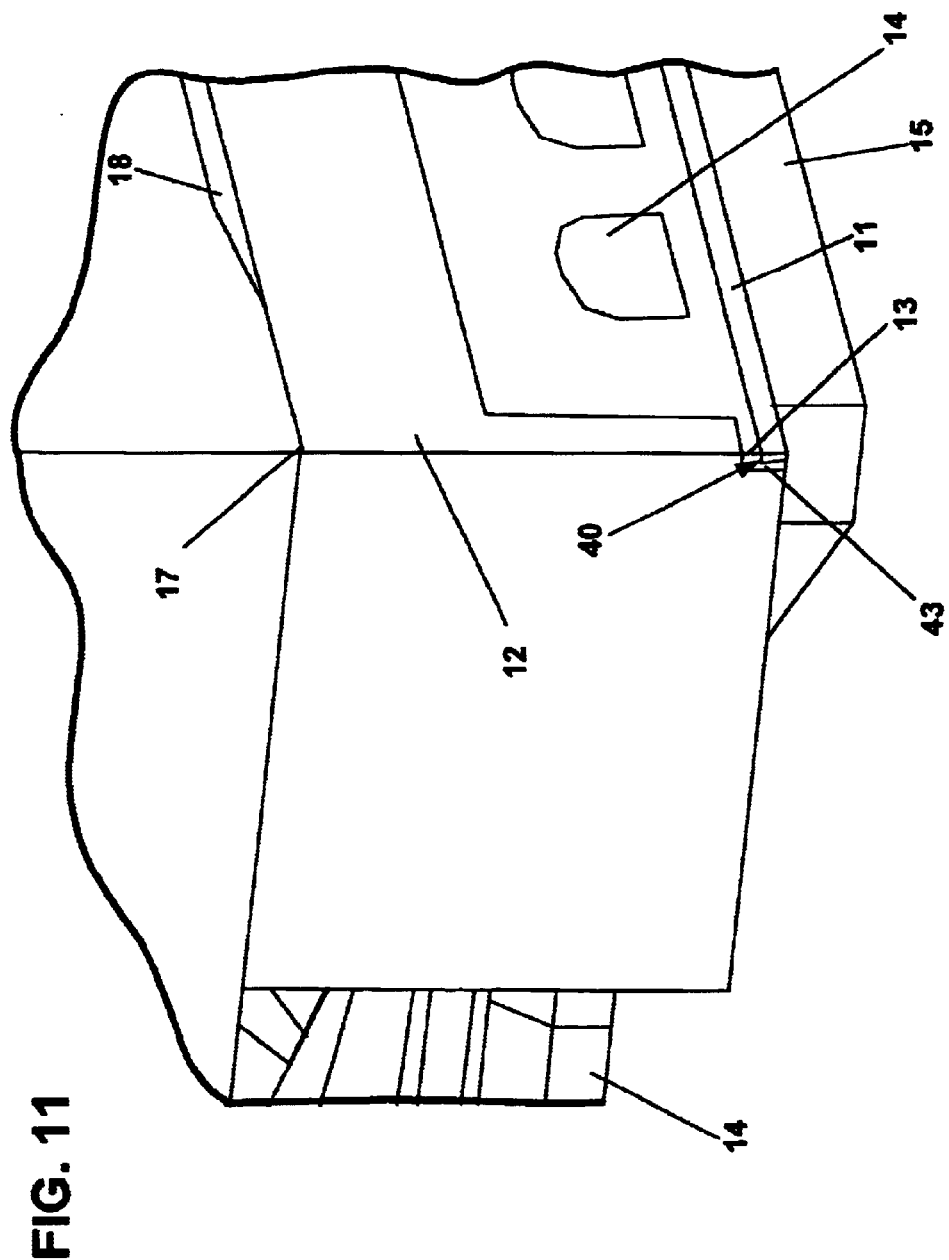
FIG. 11 is a magnified partial section perspective view of the magnetic transducer of the type shown in FIG. 10.

FIG. 7 shows the write field distributions in cross-track direction. The calculations were done for head designs according to patents '151 and '546 having identical parameters, and of the head design of the present invention. The width WW of the recorded track is defined for the media with coercivity of 4000 Oe. The head design according to the '151 patent exhibits the highest write field strength but the widest width WW. In contrast, the head design according to the '546 patent has well controlled track width WW, but cannot write on the media due to an insufficient write field. Moreover, both recording heads according to prior art suffer from the skew effect due to rectangular shape of the main pole at the ABS and hence cannot be used for high track density recording. The proposed head exhibits the narrowest track width WW with adequate strength of the write field that is insensitive to skew and can be used for high-track density perpendicular recording on thermally stable high coercivity media.

Referring now to FIGS. 8, 9, 10, and 11, the magnetic read/write head 10 for perpendicular recording on double layer media according to the present invention will be described. The read element includes first return pole 12, which also serves as a bottom shield, and top shield 16 spaced from each other by the read gap 18 with the GMR element 17 placed in the read gap 18. The first return pole 12 and top shield 16 are made of soft magnetic material with high permeability and low magnetostriction to provide high stability and high linear resolution of the reading GMR element 17.

The write element is made up of the main pole 11 and first return pole 12 with insulated coil 14 placed in-between and electrically isolated from them. The first return pole 12 is located downstream, relative to the rotation of the double layer media 20, of main pole 11. The main pole 11 and first return pole 12 each have a proximal and distal end. The proximal end of the main pole 11 and first return pole 12 are adjacent or proximate the double layer perpendicular media 20. The main pole 11 and first return pole 12 are magnetically connected to each other on a portion of their distal ends by means of magnetic stud 41, which collectively form the magnetic core. The magnetic stud 41 is enclosed by electrical coils 14, which wrap around magnetic stud 41. At the ABS, the main pole 11 and first return pole 12 are spaced from each other by narrow nonmagnetic write gap 13. To improve the writer efficiency the main pole 11 has a main pole extension 15 made of soft magnetic material with high permeability. Transitions are recorded on the double layer perpendicular medium 20 composed of the thin top layer 21, which is a recordable layer having high coercivity and unidirectional perpendicular anisotropy, and bottom layer 22, which is a soft magnetic underlayer with in-plane anisotropy having low magnetic reluctance. The distance D between the ABS of the main pole 11 and the bottom layer 22 is approximately 20 to 60 nanometers (nm). Further, distance D is not more than two times shorter than distance G of the nonmagnetic write gap 13, therefore distance G is not less than twice the distance D. This distance provides both high efficiency of the head 10 and high gradient of the write field in the thin top layer 21 during recording.

To suppress side writing, the main pole 11 has a trailing edge 40 adjacent to the write gap 13, which is sized dimensionally larger than the leading edge. The slope angle on the sides of main pole 11 is not less than the largest skew angle in the drive. The head 10 includes side shields 19, which lie parallel to the tracks on the recording medium 20. The side shields 19 are spaced from the main pole 11 by side gap 43. The distance $G_s$ of the side gap 43 is approximately equal to the distance D. The side shields 19 intercept the fringing flux generated by the main pole 11 and prevent erasing or weakening of previously recorded information on adjacent tracks. The write field distribution in cross track direction for head 10 is shown in FIG. 7, which also applies to the heads of embodiment 2 and 3. The head of the present invention exhibits the narrowest track width WW with adequate strength of the write field and can be used for high-track density perpendicular recording.

Figure 12:
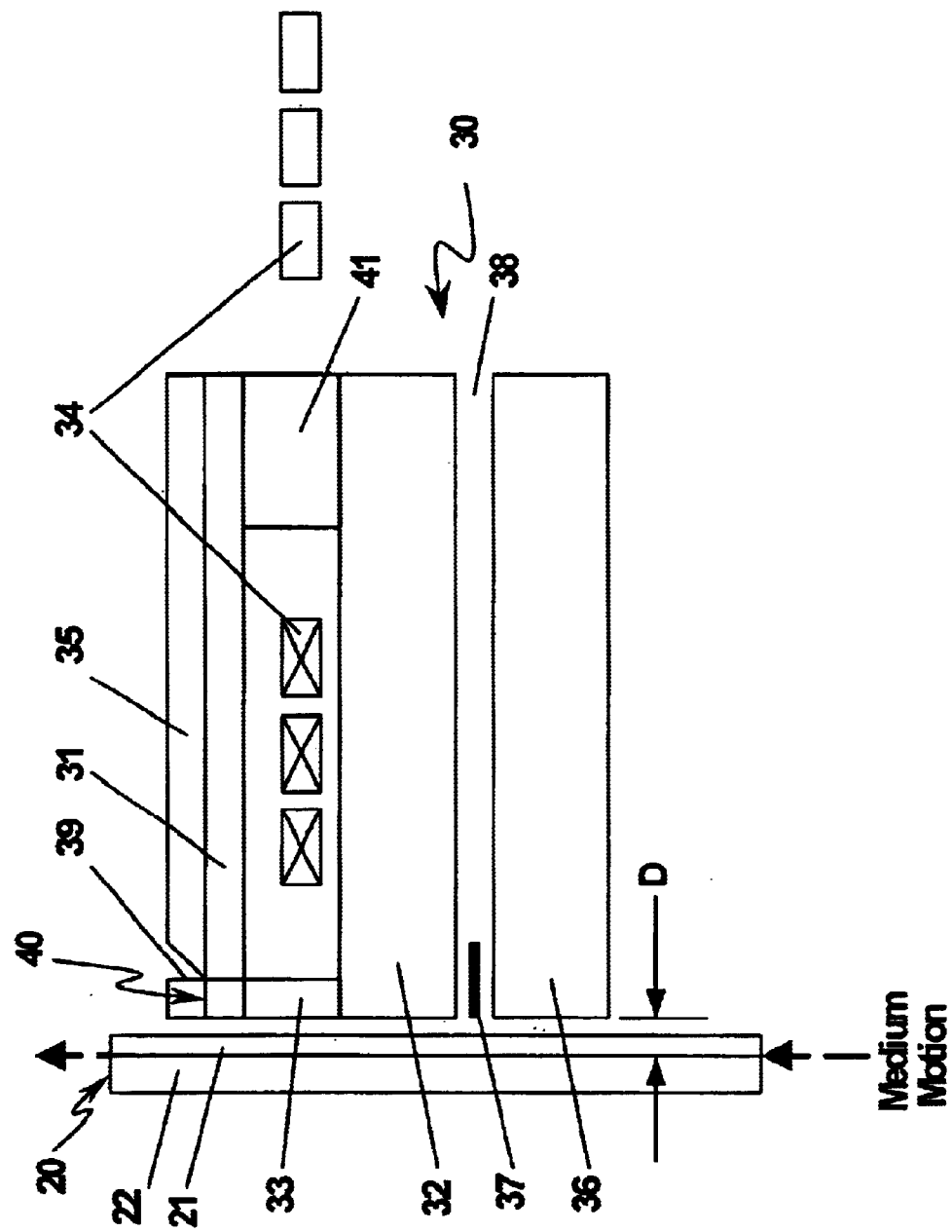
FIG. 12 is a side cross-sectional view of an alternative preferred magnetic transducer of the present invention for perpendicular recording with controllable write field gradient, wherein the write element is downstream from the reader element.
Figure 13:
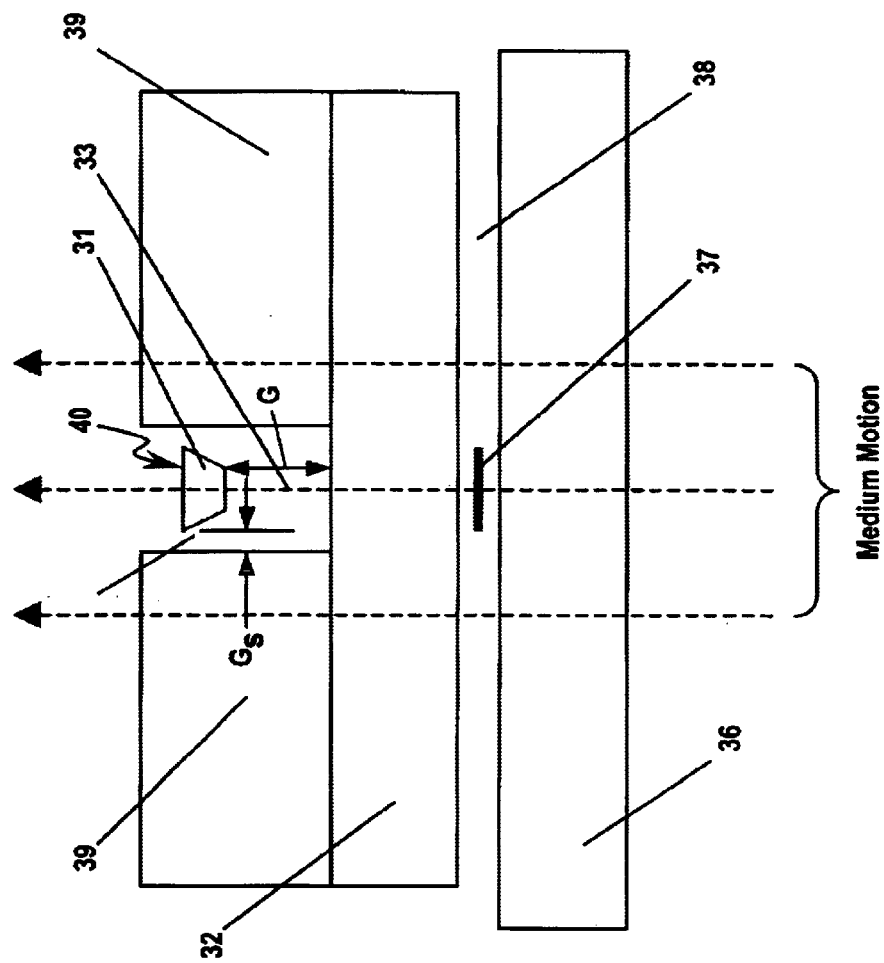
FIG. 13 is a front view taken from the ABS of the magnetic transducer of the type shown in FIG. 12.

An alternate preferred embodiment of the magnetic read/write head 360 for perpendicular recording according to the present invention is shown in FIGS. 12 and 13. In this embodiment the head 360 includes first return pole 32, which also serves as a top shield, and bottom shield 36 spaced from each other by the read gap 38 with the GMR element 37 placed in the read gap 38. The first return pole 32 and bottom shield 36 are made of soft magnetic material with high permeability and low magnetostriction to provide high stability and high linear resolution of the reading GMR element 37. Double layer perpendicular media 20 consists of a thin top layer 21, which is a recordable layer having high coercivity and unidirectional perpendicular ansistropy, and a bottom layer 22, which is a soft magnetic underlayer having in-plane anistrophy and low magnetic reluctance.

The write element includes main pole 31, main pole extension 35, and first return pole 32. Transitions are recorded at the trailing edge 40 of the main pole 31. The first return pole 32 serves as the top shield of the read sensor pole and is magnetically connected to the side shields 39. To improve the writer efficiency the main pole 31 has a main pole extension 35 made of soft magnetic material with high permeability. The first return pole 32 is located upstream, relative to the rotation of the double layer media 20, of main pole 31. The main pole 31 and first return pole 32 each have a proximal and distal end. The proximal end of the main pole 31 and first return pole 32 are adjacent or proximate the double layer media 20. The main pole 31 and first return pole 32 are magnetically connected to each other on a portion of their distal ends by magnetic stud 41, which collectively form the magnetic core. The magnetic stud 41 is enclosed by electrical coils 34, which wrap around magnetic stud 41. To suppress side writing at skew, the main pole 31 has a trailing edge 40, which is sized dimensionally larger than the leading edge. The slope angle on the sides of main pole 31 is not less than the largest skew angle in the drive. The main pole 31 and first return pole 32 are magnetically connected to each other in rear portions, or distal ends, by means of magnetic stud 41. The distance D between the ABS of the main pole 31 and the bottom layer 22 is approximately 20 to 60 nm. The distance G of write gap 33 is more than four times the distance D. Further, the distance $G_s$ of the of the side gap 43 is approximately equal to the distance D.

Figure 14:
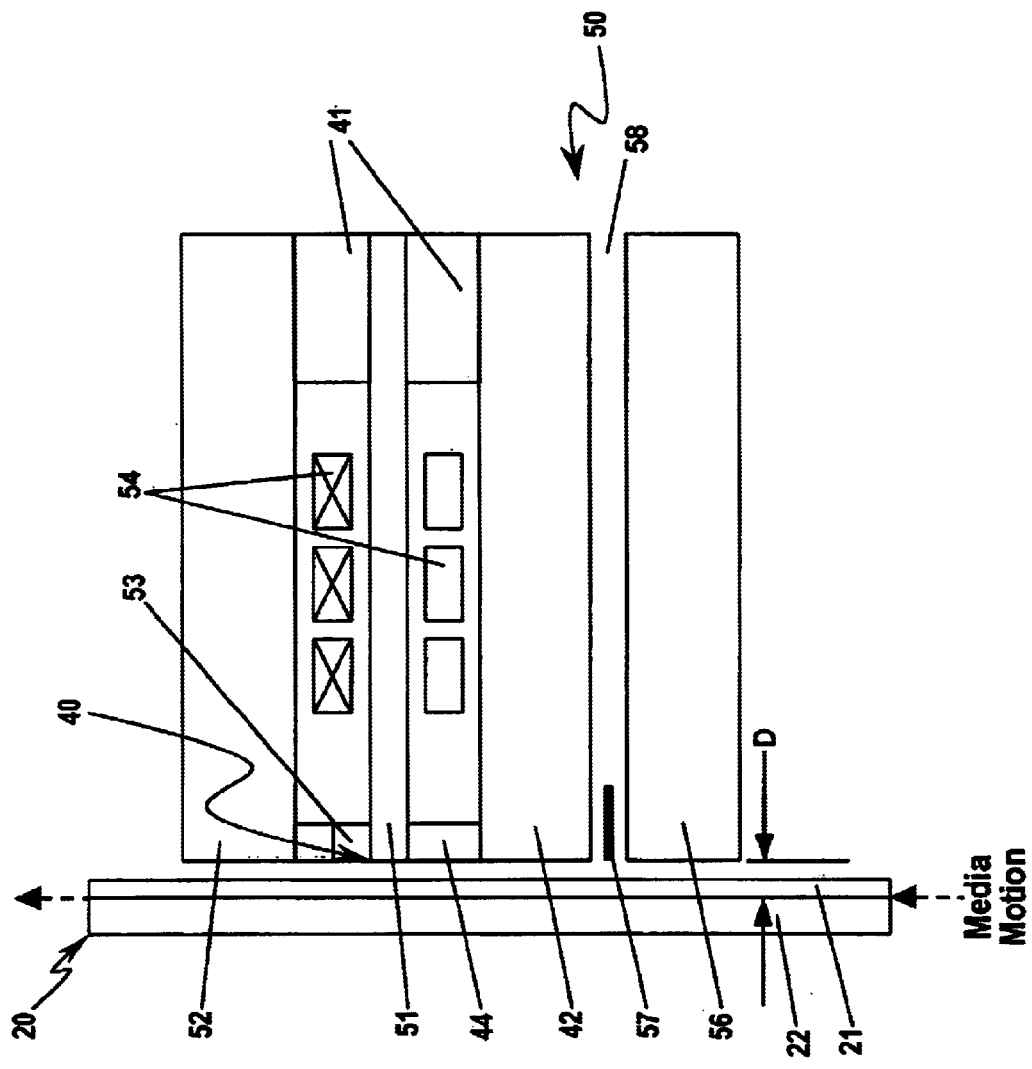
FIG. 14 is a side cross-sectional view of an alternate preferred magnetic transducer of the present invention for perpendicular recording with controllable write field gradient, wherein the write element is downstream from the reader element.
Figure 15:
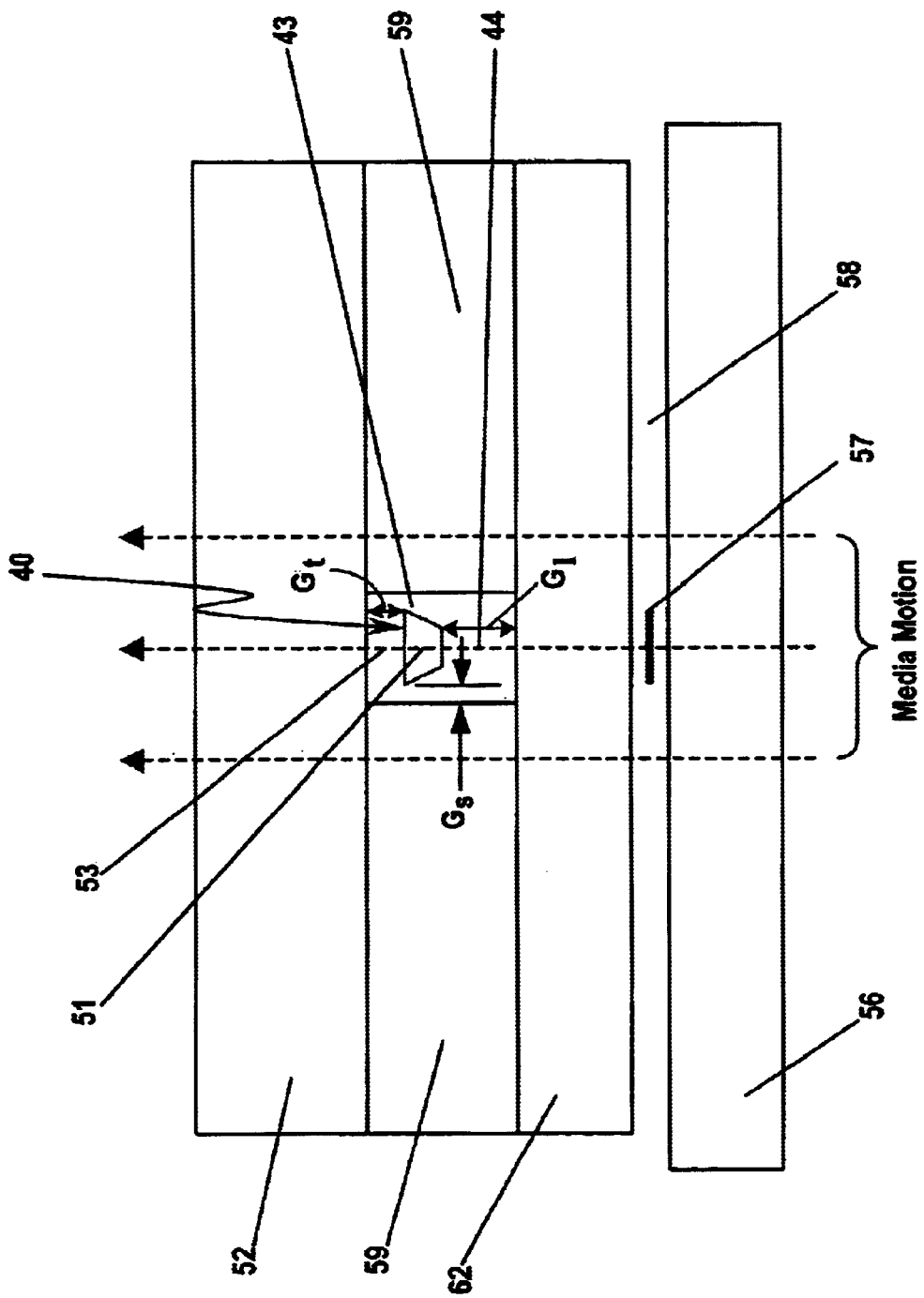
FIG. 15 is a front view taken from the ABS of the magnetic transducer of the type shown in FIG. 14.

Another alternate preferred embodiment of the magnetic read/write head for perpendicular recording according to the present invention is shown in FIGS. 14 and 15. The head 50 includes first return pole 42, which also serves as a top shield, and bottom shield 56 spaced from each other by the read gap 58 with the GMR element 57 placed in the read gap 58. The first return pole 42 and bottom shield 56 are made of soft magnetic material with high permeability and low magnetostriction to provide high stability and high linear resolution of the reading GMR element 57. Double layer perpendicular media 20 consists of a thin top layer 21, which is a recordable layer having high coercivity and unidirectional perpendicular ansistropy, and a bottom layer 22, which is a soft magnetic material having in-plane anistrophy and low magnetic reluctance.

To suppress sensitivity to the stray field in the drive, head 50 has two return poles formed by first return pole 42 and second return pole 52 with main pole 51 placed in-between. The first return pole 42 can also be designated as the leading return pole and second return pole 52 can also be designated as the trailing return pole, due to the motion of the media 20. The first return pole 42 is located upstream, relative to the rotation of the double layer media 20, of main pole 51. The main pole 51 and second return pole 52 each have a proximal and distal end. The proximal end of the main pole 51, first return pole 42, and second return pole 52 are adjacent or proximate the double layer media 20. First return pole 42 and second return pole 52 are magnetically connected to each other on a portion of their distal ends by magnetic stud 41 and by side shields 59 at the ABS. The magnetic stud 41 is enclosed by electrical coils 54, which wrap around magnetic stud 41, which collectively form the magnetic core. Main pole 51 has a trailing edge 40 adjacent second return pole 52, which is sized dimensionally larger than the leading edge of main pole 51. The head 50 has two write gaps 44 and 53, leading and trailing, respectively. The distance of leading write gap $G_l$ approximately twice or more the distance of trailing gap $G_t$, and trailing gap $G_t$ is approximately twice or more the distance of D. The side shields 59 are spaced from the main pole 51 by the side gaps 43. The distance $G_s$ of the side gaps 43 are approximately equal to or more than the distance D. Further, the distance D between the ABS of the main pole 51 and the bottom layer 22 is approximately 20 to 60 nm.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. An apparatus comprising:
a magnetic read element;
a perpendicular magnetic recording write element, said magnetic write element including a main pole, first and second spaced apart side shields, and a first return pole, wherein said main pole is positioned between said first and second side shields, said first return pole and said main pole each having a proximal and a distal end; and wherein said first side shield and said second side shield are positioned at a distance $G_s$ from said proximal end of said main pole, said main pole and said first return pole are separated by a nonmagnetic write gap, said nonmagnetic write gap being a distance G, and further wherein the distance G is greater than twice the distance $G_s$.

2. The apparatus as recited in claim 1, wherein a trailing edge of said main Dole is substantially straight.

3. The apparatus as recited in claim 1, wherein a side connecting a leading edge and a trailing edge of said main pole defines at least one slope angle equal to or greater than a maximum skew angle of said write element.

4. The apparatus as recited in claim 1, wherein said proximal end of said first return pole is adjacent said main pole and said first and second side shields, said first return pole and said main pole connected to a back magnetic stud, and a plurality of insulated coils surrounding the e magnetic stud.

5. The apparatus as recited in claim 1, wherein said first return pole also functions as a bottom shield.

6. The apparatus as recited in claim 5, wherein the first return pole also functions as a leading pole.

7. The apparatus as recited in claim 1, wherein said apparatus includes a magnetic recordable medium, said magnetic recordable medium includes a thin top layer, and a bottom layer, said main pole of said write element and said bottom layer of said medium separated by a distance D, wherein the distance G is greater than twice the distance D and the distance $G_s$ is approximately equal to or greater than the distance D.

8. The apparatus as recited in claim 7, wherein a position on said magnetic recordable medium rotates under said write element prior to rotating under said read element.

9. The apparatus as recited in claim 7, wherein a position on said magnetic recordable medium rotates under said read element prior to rotating under said write element.

10. The apparatus as recited in claim 7, wherein said main pole further includes a second return pole, said second return pole having a proximal and distal end, said proximal end of said first return pole being proximate said magnetic recordable medium and adjacent said main pole and said first and second side shields, further wherein a magnetic core is positioned between said distal ends of said second return pole and said first return pole, and further wherein said distal end of said main pole is positioned within a portion of said magnetic core.

11. The apparatus as recited in claim 10, wherein said main pole includes a leading write gap $G_l$ adjacent said first return pole and a trailing write gap $G_t$ adjacent said second return pole, further wherein the distance $G_l$ is greater than four times the distance D and the distance $G_t$ is greater than two times the distance D.

12. An apparatus comprising:

a magnetic read element; and a magnetic write element including a main pole, a first return pole positioned adjacent of said main pole thereby forming a nonmagnetic write gap, a first and second spaced apart side shield positioned on either side of said main pole, wherein said main pole has a leading edge and trailing edge, said leading edge sized dimensionally smaller than said trailing edge, further wherein said first side shield and said second side shield are positioned at a distance $G_s$ from said main pole, said nonmagnetic write gap being a distance G, and further wherein the distance G is greater than twice the distance $G_s$.

13. The apparatus as recited in claim 12, wherein said write element includes a second return pole and a magnetic core, said second return pole positioned downstream said main pole and said magnetic core is positioned between a rear portion of said first return pole and said second return pole, and further wherein a rear portion of said main pole is positioned within a portion of said magnetic core.

14. The apparatus as recited in claim 12, wherein said trailing edge is substantially straight.

15. The apparatus as recited in claim 13, wherein a side connecting said leading edge and said trailing edge defines at least one slope angle equal to or greater than a maximum skew angle on said magnetic write element.

16. The apparatus as recited in claim 12, wherein said first return pole is adjacent said main pole and said first and second side shields said first return pole and said main pole connected to a back magnetic stud, and a plurality of insulated coils surrounding the magnetic stud.

17. The apparatus as recited in claim 12, further comprising a magnetic recordable medium comprising a thin top layer and a bottom layer.

18. The apparatus as recited in claim 17, wherein said main pole of said write element and said bottom layer of said medium are separated by a distance D, wherein the distance G is greater than twice the distance D and the distance $G_s$ is approximately equal to the distance D.

19. The apparatus as recited in claim 12, wherein a position on said magnetic recordable medium rotates under said magnetic read element prior to rotating under said magnetic write element, further wherein the distance G is greater than four times the distance D.

20. An apparatus comprising:

a magnetic write element comprising a main pole, first and second spaced apart side shields, and a first return pole, wherein said main pole is positioned between said first and second side shields, said first return pole having a proximal and distal end, said proximal end of said first return pole is adjacent said main pole and said first and second side shields, wherein said first side shield and said second side shield are positioned at a distance $G_s$ from a proximal end of said main pole, said main pole and said first return pole are separated by a nonmagnetic write gap, said nonmagnetic write gap being a distance G, and further wherein the distance G is greater than twice the distance $G_s$; and a magnetic recordable medium comprising a thin top layer and a bottom layer, said main pole of said write element and said bottom layer of said medium separated by a distance D, further wherein the distance G is greater than twice the distance D and the distance $G_8$ is approximately equal to the distance D.

21. The apparatus as recited in claim 20, further comprising a plurality of insulated coils surrounding a magnetic core positioned between distal ends of said main pole and said first return pole.

22. The apparatus as recited in claim 20, wherein said main pole has a leading edge and trailing edge, said leading edge sized dimensionally smaller than said trailing edge.

23. The apparatus as recited in claim 22, wherein the first return pole functions as a bottom shield.

24. The apparatus as recited in claim 22, wherein said trailing edge is substantially straight.

25. The apparatus as recited in claim 24, wherein a side connecting said leading edge and said trailing edge defines at least one slope angle equal to or greater than a maximum skew angle on said magnetic write element.

26. The apparatus as recited in claim 22, wherein a position on said magnetic recordable medium rotates under said magnetic write element prior to rotating under a magnetic read element.

27. The apparatus as recited in claim 23, wherein a position on said magnetic recordable medium rotates under a magnetic read element prior to rotating under said magnetic write element, further wherein the first return pole functions as the leading pole.

28. The apparatus as recited in claim 20, wherein said main pole further includes a second return pole, said second return pole having a proximal and distal end, said proximal end of said first return pole being proximate said magnetic recordable medium and adjacent said main pole and said first and second side shields further wherein a magnetic core is positioned between said distal ends of said second return pole and said first return pole, and further wherein a distal end of said main pole is positioned within a portion of said magnetic core.

29. The apparatus as recited in claim 28, wherein said main pole includes a leading write gap $G_l$ adjacent said first return pole and a trailing write gap $G_t$ adjacent said second return pole, further wherein the distance $G_l$ is greater than four times the distance D and the distance $G_t$ is greater than two times the distance D.

* * * * *